United States Patent
Yang et al.

(10) Patent No.: US 10,198,801 B2
(45) Date of Patent: *Feb. 5, 2019

(54) IMAGE ENHANCEMENT USING SELF-EXAMPLES AND EXTERNAL EXAMPLES

(71) Applicant: Adobe Systems Incorporated, San Jose, CA (US)

(72) Inventors: Jianchao Yang, San Jose, CA (US); Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/392,162

(22) Filed: Dec. 28, 2016

(65) Prior Publication Data

US 2017/0109873 A1    Apr. 20, 2017

Related U.S. Application Data

(63) Continuation of application No. 14/020,969, filed on Sep. 9, 2013, now Pat. No. 9,569,684.

(51) Int. Cl.
| | | |
|---|---|---|
| *G06T 3/40* | (2006.01) | |
| *G06T 5/50* | (2006.01) | |
| *G06T 5/00* | (2006.01) | |
| *G06K 9/46* | (2006.01) | |
| *G06K 9/62* | (2006.01) | |

(52) U.S. Cl.
CPC .................. *G06T 5/50* (2013.01); *G06K 9/46* (2013.01); *G06K 9/4609* (2013.01); (Continued)

(58) Field of Classification Search
CPC ... G06T 3/4053; G06T 3/4061; G06T 3/4076; G06T 5/50; G06T 5/002; G06T 5/003;
(Continued)

(56) References Cited

U.S. PATENT DOCUMENTS

| | | | |
|---|---|---|---|
| 2010/0135593 A1* | 6/2010 | Tanaka .................... | G06T 3/403 382/266 |
| 2011/0206296 A1* | 8/2011 | Sakaguchi ............ | G06T 3/4053 382/299 |

(Continued)

OTHER PUBLICATIONS

Freedman et al., Image and video upscaling from local self-examples, ACM Transactions on Graphics 28, 2010, pp. 1-10.
(Continued)

*Primary Examiner* — Geoffrey E Summers
(74) *Attorney, Agent, or Firm* — Kilpatrick Townsend & Stockton LLP

(57) ABSTRACT

Systems and methods are provided for image enhancement using self-examples in combination with external examples. In one embodiment, an image manipulation application receives an input image patch of an input image. The image manipulation application determines a first weight for an enhancement operation using self-examples and a second weight for an enhancement operation using external examples. The image manipulation application generates a first interim output image patch by applying the enhancement operation using self-examples to the input image patch and a second interim output image patch by applying the enhancement operation using external examples to the input image patch. The image manipulation application generates an output image patch by combining the first and second interim output image patches as modified using the first and second weights.

20 Claims, 9 Drawing Sheets

(52) U.S. Cl.
CPC ......... *G06K 9/4647* (2013.01); *G06K 9/6259* (2013.01); *G06T 3/4053* (2013.01); *G06T 3/4076* (2013.01); *G06T 5/002* (2013.01); *G06T 5/003* (2013.01); *G06T 2207/10024* (2013.01); *G06T 2207/20192* (2013.01); *G06T 2207/20216* (2013.01)

(58) Field of Classification Search
CPC . G06T 2207/20216; G06T 2207/20192; G06T 2207/10024; G06K 9/4609; G06K 9/4647; G06K 9/46; G06K 9/6259
USPC .......................................... 382/298, 299, 300
See application file for complete search history.

(56) References Cited

U.S. PATENT DOCUMENTS

| | | |
|---|---|---|
| 2011/0222783 A1 | 9/2011 | Matsunobu |
| 2013/0034299 A1 | 2/2013 | Lin et al. |
| 2013/0034311 A1 | 2/2013 | Lin et al. |
| 2013/0034313 A1 | 2/2013 | Lin et al. |
| 2013/0084014 A1* | 4/2013 | Huang .................... G06T 3/403 382/199 |

OTHER PUBLICATIONS

Freeman et al., Example-based super-resolution, Computer Graphics and Applications, 2002, pp. 56-65.
Glasner et al., Super-resolution from a single image, ICCV, 2009, 8 pages.
Yang, et al., Fast image super-resolution based on in-place example regression, IEEE CVPR, 2013, 8 pages.
Zhu, Xiang and Peyman Milanfar, Automatic Parameter Selection for Denoising Algorithms Using a No-Reference Measure of Image Content, Image Processing, IEEE Transactions on Dec. 19, 2010, pp. 3116-3132.
Notice of Allowance from related U.S. Appl. No. 14/020,969 dated Sep. 30, 2016, 12 pages.

\* cited by examiner

IMAGE ENHANCEMENT USING SELF-EXAMPLES AND EXTERNAL EXAMPLES

CROSS-REFERENCE TO RELATED APPLICATIONS

This application is a continuation of U.S. patent application Ser. No. 14/020,969, filed on Sep. 9, 2013, now allowed, which is incorporated herein by reference.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to computer-implemented methods and systems and more particularly relates to image enhancement using self-examples in combination with external examples.

BACKGROUND

Image manipulation programs are used to enhance or modify digital image content. For example, an image manipulation program can increase the resolution of digital image content, decrease a level of noise present in the digital image content, and/or decrease an amount of blurring of the digital image content.

Prior solutions for image enhancement may involve deficiencies. For example, image enhancement operations may involve up-sampling a digital image to increase the resolution of the digital image. Up-sampling the digital image may blur or otherwise remove high-frequency content. High-frequency content can include image content having a greater variety of detail, such as a picture of a multi-colored building having a variety of differently shaped windows, doors, and other structures. Removing high-frequency content may negatively impact the aesthetic quality of the digital image.

It is therefore desirable to improve operations used for image enhancement operations.

SUMMARY

One embodiment involves an image manipulation application that can perform image enhancement using self-examples in combination with external examples. The embodiment involves receiving an input image patch of an input image. The embodiment also involves determining a first weight for an enhancement operation using self-examples and a second weight for an enhancement operation using external examples. The embodiment also involves generating a first interim output image patch by applying the enhancement operation using self-examples to the input image patch. The embodiment also involves generating a second interim output image patch by applying the enhancement operation using external examples to the input image patch. The embodiment also involves generating an output image patch by combining the first interim output image patch as modified using the first weight and the second interim output image patch as modified using the second weight.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
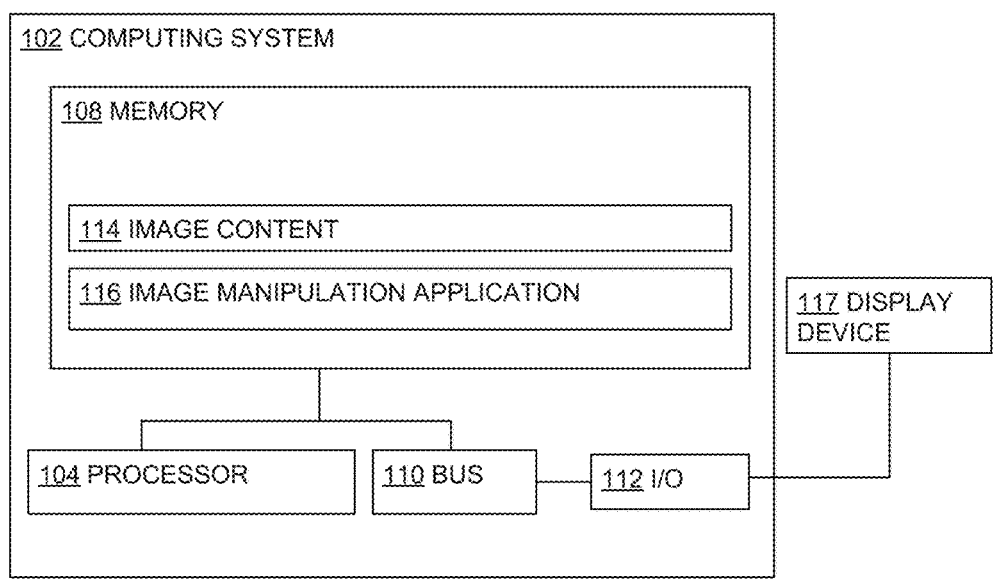
FIG. 1 is a block diagram depicting an example computing system for implementing certain embodiments.

Computer-implemented systems and methods are disclosed for image enhancement using self-examples in combination with external examples. Self-examples can include images generated by processing an input image to be enhanced. For example, self-examples can include images generated by up-sampling and/or blurring the input image. External examples can include images having similar image content to the input image. For example, an input image of a sunrise taken from a first location at a first time of day can be enhanced using a different picture of a sunrise taken from a second location near the first location at a second time of day around the first time of day.

Using self-examples in combination with external examples can leverage advantages associated with each type of enhancement operation. For example, enhancement operations using self-examples may be more suitable for image content having uniform or near-uniform pixel values (e.g., a blue sky with few clouds) and enhancement operations using external examples may be more suitable for image content having a variety of pixels values (e.g., a photograph of a group of clowns wearing different colored outfits). Adaptively combining the results of both types of enhancement operations can improve the quality of an output image generated from an image having both types of image content.

The following non-limiting example is provided to help introduce the general subject matter of the present disclosure. An image manipulation application may perform a super-resolution operation to generate a high-resolution version of a low-resolution image. As an interim step, the super-resolution operation may involve up-sampling the low-resolution image to generate an interim up-sampled image. The interim up-sampled image can have a higher resolution than the input image. However, up-sampling the low-resolution image may also cause blurring such that the up-sampled image lacks at least some high-frequency content that is present in the input image. High-frequency content can include image content for a region in which pixel values are highly variable across the region. For example, an image of a hand wearing different pieces of jewelry may include a variety of colors and shapes that are depicted using a variety of pixel values. To resolve the removal of high-frequency content from the up-sampled image, the image manipulation application may augment the interim up-sampled image with high-frequency content extracted from a combination of self-example images and external example images. A self-example image can be an image generated by applying a blurring operation to the input image. The blurring operation can cause a similar amount of blurring as the up-sampling operation without removing the high-frequency content. An external example image can include an image having a high-frequency version of image content that is similar to high-frequency content of the input image. The image manipulation application can extract high-frequency content from both the self-example image and the external example image. The image manipulation application can apply the extracted high-frequency content to the interim up-sampled image. Applying the extracted high-frequency content to the interim up-sampled image can generate a higher-resolution output image that includes the high-frequency content. The image manipulation application can iteratively perform the super-resolution operation. Each iteration can involve using an output image from a previous iteration as the input image to the current iteration. The iterative process can terminate in response to obtaining an output image having a target resolution.

In accordance with some embodiments, an image manipulation application can perform image enhancement using self-examples in combination with external examples. The image manipulation application can receive an input image patch of an input image. The image manipulation application can generate a first interim output image patch by applying an image enhancement operation using self-examples to the input image patch. The image manipulation application can generate a second interim output image patch by applying the enhancement operation using external examples to the input image patch. The image manipulation application can determine a first weight for an enhancement operation that uses self-examples and a second weight for a different enhancement operation that uses external examples. The first and second weights can be determined based on image content of an up-sampled version of the input image patch. The first and second weights can determine the relative contributions of interim output image patches respectively generated by the enhancement operation using self-examples and the enhancement operation using external examples. For example, for an input image patch from a region with greater uniformity in pixel values, applying a heavier weight to the interim output image patch generated using self-examples may be desirable. For an input image patch from a region with greater variety in pixel values, applying a heavier weight to the interim output image patch generated using external examples may be desirable. The image manipulation application can generate an output image patch by combining the weighted first and second interim output image patches. The image manipulation application can apply the process described above to each of the input image patches of the input image to generate a set of output image patches. The image manipulation application can combine the output image patches to generate an output image.

As used herein, the term "image content" is used to refer to any image that can be rendered for display or use at a computing system or other electronic device. Image content can include still images, video, or any combination thereof.

As used herein, the term "patch" is used to refer to a partitioned portion of image content. An image can be partitioned into multiple patches of equal size that overlap one another. Non-limiting examples of patch sizes include 5 pixels×5 pixels, 7 pixels×7 pixels, and 10 pixels×10 pixels. A suitable patch size can provide a pixel-level correspondence between an input image patch and image patches obtained from self-examples and external examples.

As used herein, the term "image enhancement operation" is used to refer to generating an output image having an improvement in quality for one or more attributes of an input image. Non-limiting examples of an image enhancement operation include a super-resolution operation for generating a high-resolution output image from a low-resolution input image, a de-noising operation for generating a de-noised output image from a noisy input image, and a de-blurring operation for generating a sharp output image from a blurry input image.

Referring now to the drawings, FIG. 1 is a block diagram depicting an example computing system 102 for implementing certain embodiments.

The computing system 102 can include a processor 104 that is communicatively coupled to a memory 108. The processor 104 can execute computer-executable program instructions or other program code and/or accesses information stored in the memory 108. Non-limiting examples of the processor 104 may include a microprocessor, an application-specific integrated circuit ("ASIC"), a state machine, or other processing device. The processor 104 can include any of a number of computer processing devices, including one. Such a processor can include or may be in communication with a computer-readable medium storing program code that can be executed by the processor 104 to cause the processor to perform the steps described herein.

The computing system 102 can also include a number of external or internal devices, such as input or output devices. For example, the computing system 102 is shown with an input/output ("I/O") interface 112 and a display device 117. A bus 110 can also be included in the computing system 102.

The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

The memory 108 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions or other program code. The instructions or other program code may comprise processor-specific instructions generated by a compiler and/or an interpreter from code written in any suitable computer-programming language, including, for example, C, C++, C#, Visual Basic, Java, Python, Perl, JavaScript, and ActionScript.

An image manipulation application 116 stored in the memory 108 can configure the processor 104 to modify the image content 114. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 2:
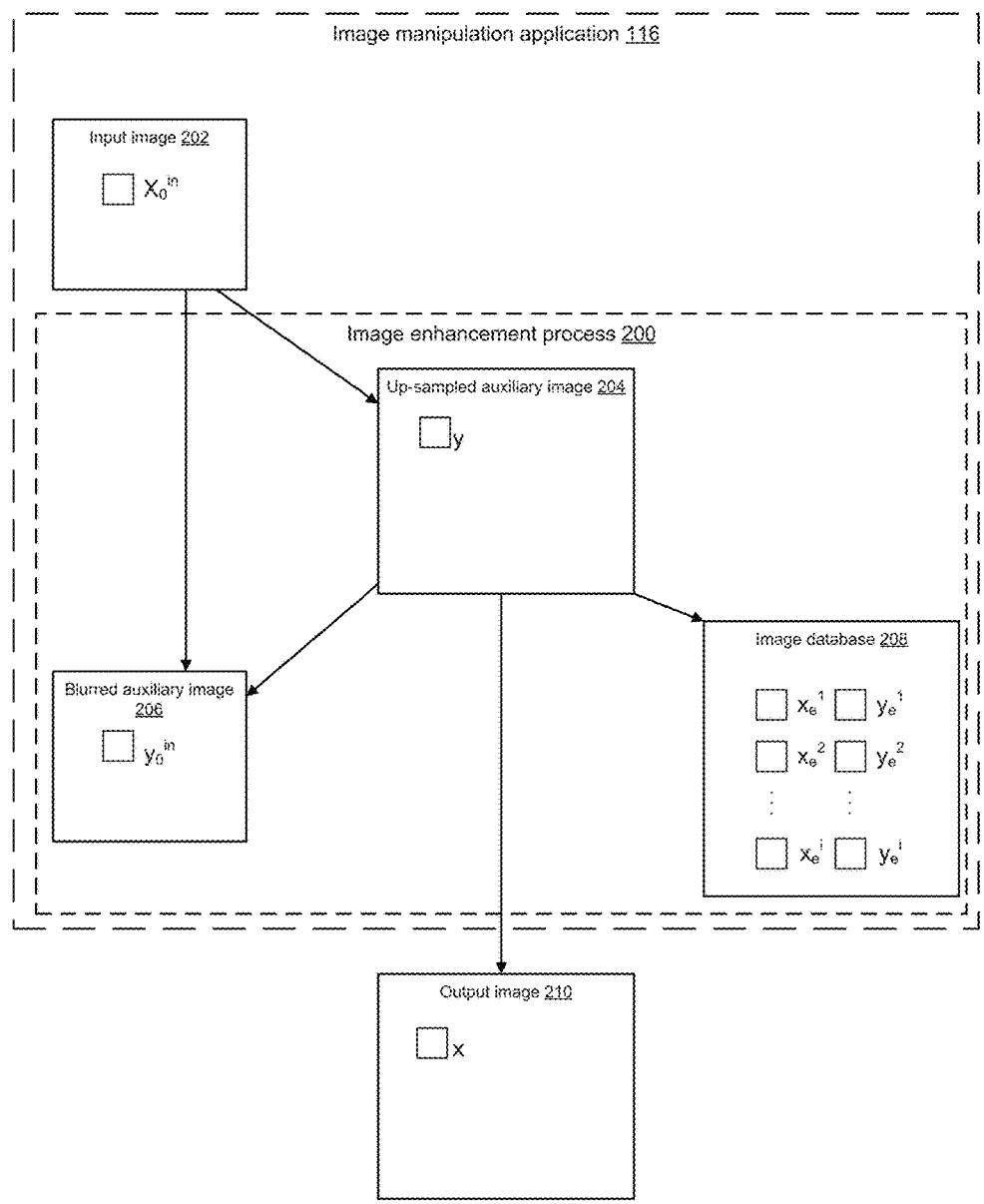
FIG. 2 is a modeling diagram illustrating an image manipulation application generating an output image from an input image, an up-sampled auxiliary image, a blurred auxiliary image, and a set of external image patch pairs from an image database.

FIG. 2 is a modeling diagram illustrating an image manipulation application generating an output image from an input image 202, an up-sampled auxiliary image 204, a blurred auxiliary image 206, and a set of external image patch pairs from an image database 208. The image manipulation application 116 can perform an image enhancement process 200. The image enhancement process 200 can generate an output image 210 from the input image 202 using an up-sampled auxiliary image 204, self-examples of high-frequency content from a blurred auxiliary image 206, and external examples of high-frequency content from the image database 208.

The input image 202 can include digital image content. The input image 202 can include one or more undesirable characteristics, such as low resolution, blurred content, noise, etc. The input image 202 can be retrieved from the image content 114 or otherwise received by the image manipulation application 116.

The up-sampled auxiliary image 204 can be generated from the input image 202. The image manipulation application 116 can generate the up-sampled auxiliary image 204 by applying an up-sampling operation to the input image 202 using a sampling factor s. Non-limiting examples of an up-sampling operation include bicubic interpolation and bilinear interpolation.

The blurred auxiliary image 206 can be generated from the input image 202. The image manipulation application 116 can generate a blurred auxiliary image 206 by applying a blurring operation to the input image 202. Non-limiting examples of a blurring operation include Gaussian blurring, down-sampling followed by up-sampling, etc. One or more blurring parameters can be selected such that statistics of the image spectrum of blurred auxiliary image 206 correspond to the statistics of the up-sampled auxiliary image 204. For example, blurring of content in the up-sampled auxiliary image 204 caused by up-sampling can be similar to the blurring of content in the blurred auxiliary image 206 caused by applying Gaussian blurring to the input image 202.

The image database 208 can include a set of image patches $\{x_e^i, y_e^i\}_{i=1}^M$. For each image patch pair $x_e^i$, $y_e^i$, each image patch $x_e^i$ can be a high-resolution patch and the image patch $y_e^i$ can be a low-resolution version of the high-resolution image patch $x_e^i$. The image patches in the image database 208 can be obtained from image pairs including a high-resolution image and a corresponding low-resolution version of the high-resolution image. The low-resolution image can be generated by down-sampling the high-resolution image using the sample sampling factor s used to generate the up-sampled auxiliary image 204.

In some embodiments, the image database 208 can be stored in the memory 108. In other embodiments, the image database 208 can be stored at a remote system accessible by the computing system 102 via a data network.

The image manipulation application 116 can generate the output image 210 that is an enhanced version of the input image 202. Image patches x for the output image 210 can be generated by combining image patches y from the up-sampled auxiliary image 204 with high-frequency content obtained from image patches $y_0^{in}$ of the blurred auxiliary image 206 and/or image patches $x_e^i$, $y_e^i$ from the image database 208. For each unknown patch x of the output image 210, the image manipulation application 116 can select corresponding image patches $x_0^{in}$, y, and $y_0^{in}$ from a corresponding spatial locations in the input image 202, the up-sampled auxiliary image 204, and the blurred auxiliary image 206. The image manipulation application 116 can execute a self-example estimation function using the image patches $x_0^{in}$, y, and $y_0^{in}$ to obtain a first interim output image patch $\hat{x}_{in}$ for x. The image manipulation application 116 can execute an external example estimation function using suitable training patches retrieved from the image database 208 to obtain a second interim output image patch $\hat{x}_e$. The image manipulation application 116 can adaptively combine the first interim output image patch $\hat{x}_{in}$ and the second interim output image patch $\hat{x}_e$ based on a patch content metric and/or confidence associated with the interim output image patches, as described in detail below.

In some embodiments, the image enhancement process 200 depicted in FIG. 2 can be performed iteratively. The output image 210 of a previous iteration can be used as the input image 202 for a current iteration. For example, the image manipulation application 116 can perform a super-resolution operation using iterations of the image enhancement process 200. A target resolution can be set for the output image 210. Each iteration can incrementally increase the resolution for the output image 210 toward the target resolution. The image manipulation application 116 can terminate the iterative execution of the image enhancement process 200 in response to the image manipulation application 116 outputting an image having a target image resolution.

Figure 3:
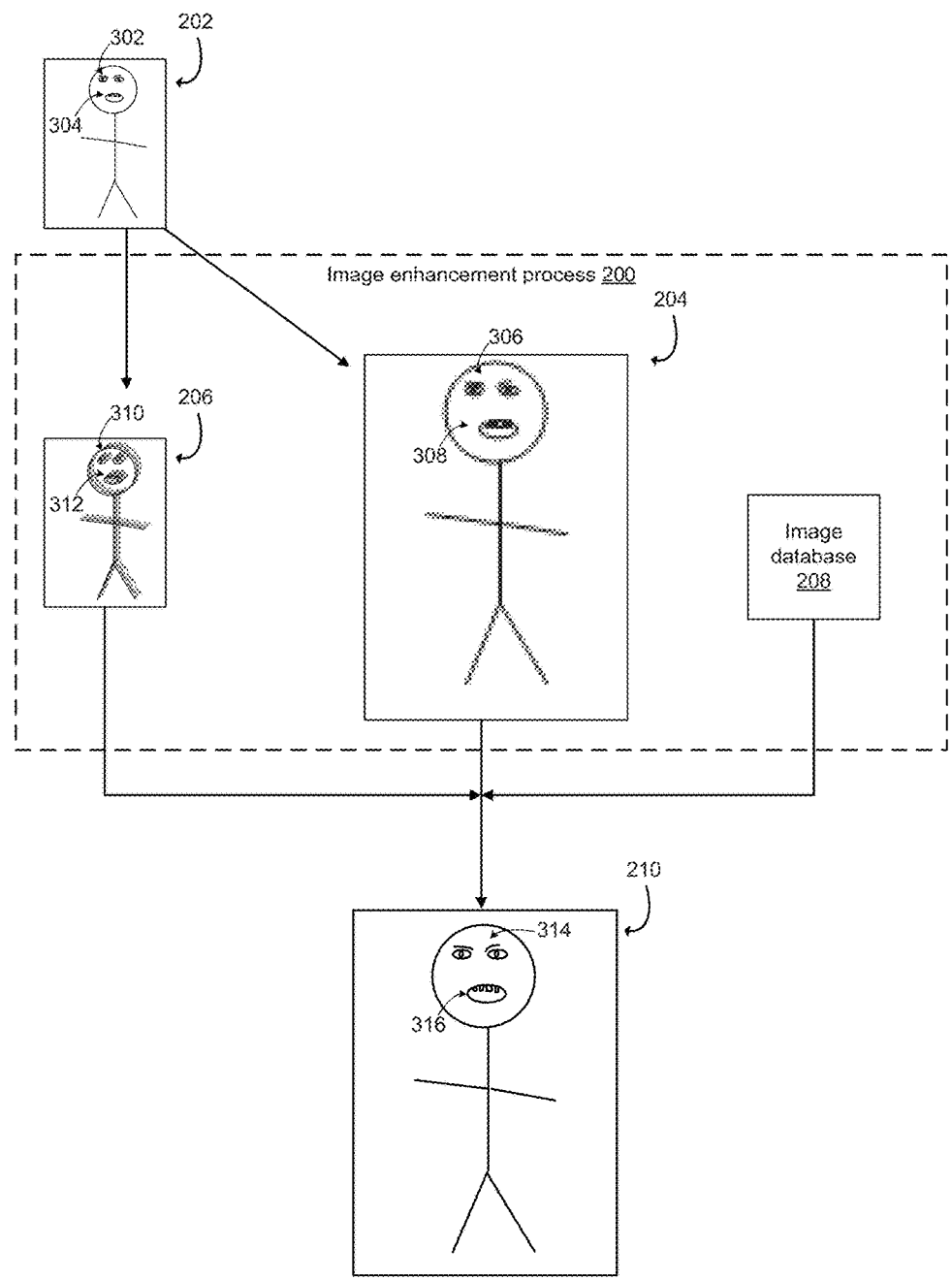
FIG. 3 is a modeling diagram illustrating an example of the output image being generated from examples of the input image, the up-sampled auxiliary image, the blurred auxiliary image, and the set of external image patch pairs from the image database.

FIG. 3 is a modeling diagram illustrating an example of the output image 210 being generated from examples of the input image 202, the up-sampled auxiliary image 204, the blurred auxiliary image 206, and the set of external image patch pairs from the image database 208.

A low-resolution input image 202 can be an image of a person having eyes displayed in image portion 302 and teeth displayed in image portion 304. Up-sampling the input image 202 can generate an up-sampled auxiliary image 204 having a higher resolution than the input image 202. High-frequency content can be lost in the process of up-sampling such that the up-sampled auxiliary image 204 appears blurred. For example, the eyebrow and eye features are less distinct in an image portion 306 as compared to the image portion 302 and the individual teeth are less distinct in an image portion 308 as compared to the image portion 304. The image portions 306, 308 have a higher resolution than the image portions 302, 304 of the input image 202, but lack the high-frequency content with respect to the eye and teeth features present in the image portions 302, 304 of the input image 202.

Applying a Gaussian blurring or other blurring operation to the input image 202 can generate a blurred auxiliary image 206 having blurred features. For example, the blurred auxiliary image 206 can also include blurred versions of the eye and eyebrow features in an image portion 310 and blurred versions of the teeth features in an image portion 312.

The output image 210 can include an image portion 308 having a higher resolution than the input image 202 and having comparable high-frequency content with respect to the input image 202. For example, the eyebrow and eye features are as distinct or nearly as distinct in an image portion 314 as compared to the image portion 302. The individual teeth are as distinct or nearly as distinct in an image portion 308 as compared to the image portion 304.

Figure 4:
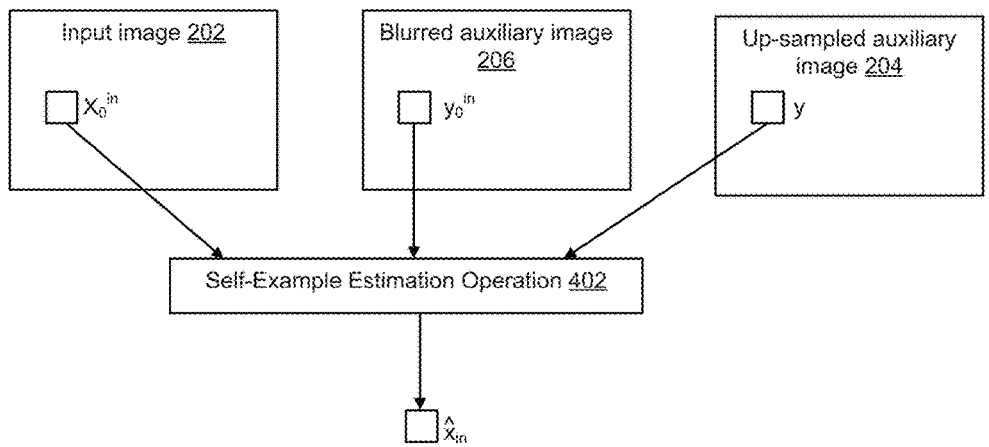
FIG. 4 is a modeling diagram depicting an interim output image patch being generated using self-examples.

The image enhancement process 200 can involve generating a first interim output image patch using self-examples. For example, FIG. 4 is a modeling diagram depicting an interim output image patch being generated using self-examples. To generate an high-resolution interim output image patch $\hat{x}_{in}$, the image manipulation application 116 can select an image patch y from up-sampled auxiliary image 204 that corresponds to a spatial location (u, v) of the output image patch $\hat{x}_{in}$. The image manipulation application 116 can identify a suitable matching patch $y_0^{in}$ corresponding to the image patch y. In some embodiments, the image can identify the matching patch $y_0^{in}$ by searching in an area in the vicinity of the spatial location (u/s, v/s) on the blurred auxiliary image 206. The matching patch $y_0^{in}$ can be a patch having the smallest patch distance. In other embodiments, the image can identify the matching patch $y_0^{in}$ by selecting a patch at the spatial location (u/s, v/s) on the blurred auxiliary image 206. The image manipulation application 116 can select an image patch $x_0^{in}$ from the input image 202 that is a sharper version of the matching patch $y_0^{in}$.

Matching image patches can include identifying a first image patch from a first image and identifying a second patch from a second region for which pixels in the second patch have the same or similar values as pixels in the first patch. For example, patches from an image region 306 that include portions of the eyes in the up-sampled auxiliary image 204 can correspond to patches from an image portion 310 that also include portions of the eyes in the blurred auxiliary image 206. A matching error can indicate a difference in image content between patches identified as matching patches. For example, a lower matching error may occur for matching patches selected from the centers of different images. The image manipulation application 116 can match image patches using simple local image structures (e.g., lines and arcs) that compose real-world scenes depicted in each image. Simple image structures can be more invariant to scale changes (i.e., an upper scale image can include singular structures similar to those in its lower spatial scale). An image structure in an image having a higher scale can have a similar structure in an origin location on an image including the same content and having a lower scale.

The image manipulation application 116 can generate an interim output image patch $\hat{x}_{in}$ by performing a self-example estimation operation 402 with the image patches y and the matching patches $y_0^{in}$ and $x_0^{in}$ as inputs. A non-limiting example of self-example estimation operation 402 is provided by the formula $$\hat{x}_{in} = f(x_0^{in}, y_0^{in}, y),$$

where $f$ is a regression function. One non-limiting example of a regression function is a frequency transfer function such as $$f(x_0^{in}, y_0^{in}, y) = y + x_0^{in} - y_0^{in},$$

which transfers the high-frequency layer generated from $(x_0^{in} - y_0^{in})$ to the image patch y. Another non-limiting example of a regression function is an error correction function such as $$f(x_0^{in}, y_0^{in}, y) = x_0^{in} + W^T(y - y_0^{in}),$$

where W is an error correction term provided to the image manipulation application 116 via one or more external inputs or learned by the image manipulation application 116 via a suitable machine learning algorithm. In some embodiments, the regression function $f$ can be defined for the image manipulation application 116 using external inputs. In other embodiments, the image manipulation application 116 can learn the regression function $f$ using any suitable machine-learning algorithm.

In some embodiments, W can be a matrix $\nabla f^T(y_0)$ described by the functions $$x = f(y)$$
$$= (y_0 + y - y_0)$$
$$= f(y_0) + \nabla f^T(y_0)(y - y_0) + o(\|y - y_0\|_2^2)$$
$$\approx x_0 + \nabla f^T(y_0)(y - y_0).$$

Thus, W can be a variable value depending on $y_0^{in}$. $\nabla f^T(y_0)$ can be determined from the function $$\min_{\{\nabla f(c_j)\}_{j=1}^n} \sum_{i=1}^m \|x_i - x_{0i} - \nabla f(c_*^i)(y_i - y_{0i})\|_2^2$$

for a set of training image patches $\{y_i, x_i\}_{i=1}^m$ and their corresponding prior in-place example pairs $\{y_{0i}, x_{0i}\}_{i=1}^m$ for n anchor points, where $c_*^i$ is the nearest anchor point to $y_{0i}$. A learned or otherwise determined value of W can produce high-resolute image patches.

Figure 5:
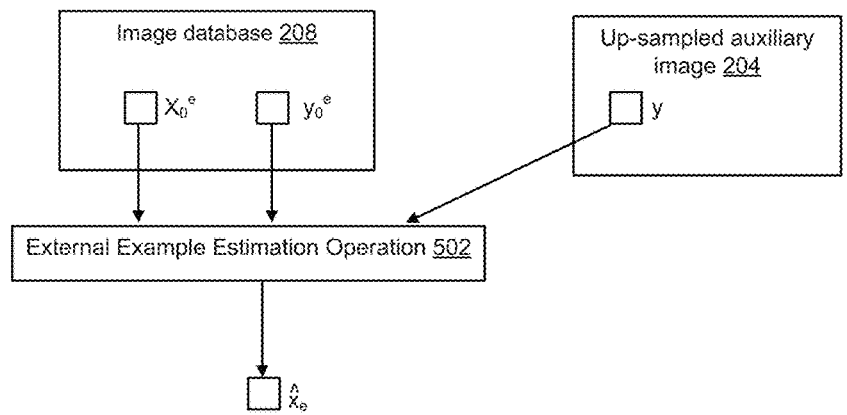
FIG. 5 is a modeling diagram depicting an interim output image patch being generated using external examples.

FIG. 5 is a modeling diagram depicting an interim output image patch being generated using external examples.

To generate an high-resolution interim output image patch $\hat{x}_e$, the image manipulation application 116 can select an image patch y from up-sampled auxiliary image 204 that corresponds to the spatial location of the output image patch $\hat{x}_e$. The image manipulation application 116 can search the external image patch pairs $\{x_e^i, y_e^i\}_{i=1}^M$ to obtain an external image patch pair. The external image patch pair can include an image patch $y_0^e$ that matches the image patch y and an image patch $x_0^e$ that is a high resolution version of the image patch $y_0^e$. The image manipulation application 116 can generate an interim output image patch $\hat{x}_e$ by performing an external example estimation operation 502 with the patches y, $y_0^e$, and $x_0^e$ as inputs.

The image manipulation application 116 can obtain image patch pairs $\{x_e^i, y_e^i\}_{i=1}^M$ from a set of image pairs $\{X^i, Y^i\}_{i=1}^N$ in the image database 208. The image manipulation application 116 can access a set of high-resolution training images $\{X^i\}_{i=1}^N$ from the image database 208. The image manipulation application 116 can smooth and down-sample the high-resolution training images $\{X^i\}_{i=1}^N$ by a factor of s to generate a corresponding set of low-resolution training images $\{X_0^i\}_{i=1}^N$. The image manipulation application 116 can generate a set of images $\{Y^i\}_{i=1}^N$ from the low-resolution training images $\{X_0^i\}_{i=1}^N$ by performing bicubic or bilinear interpolation using an interpolation factor of s. The set of images $\{Y^i\}_{i=1}^N$ can have the same sizes as the high-resolution training images $\{X^i\}_{i=1}^N$. The set of images $\{Y^i\}_{i=1}^N$ can lack the high-frequency content of the high-resolution training images $\{X^i\}_{i=1}^N$.

The image manipulation application 116 can randomly sample M image patch pairs $\{x_e^i, y_e^i\}_{i=1}^M$ from the set of image pairs $\{X^i, Y^i\}_{i=1}^N$. The image patch pairs can be sampled from the same locations of each image pair. An image patch $x_e^i$ can be a high-resolution image patch of size p×p. An image patch $y_e^i$ can be a corresponding low-resolution patch of the same size p×p. The external image patch pairs $\{x_e^i, y_e^i\}_{i=1}^M$ can be organized in any suitable manner that allows for efficient searching of patches or groups of patches. For example, the training image patch pairs $\{x_e^i, y_e^i\}_{i=1}^M$ can be organized in groups or in a tree structure. Groups or tree structures can be obtained with flat or hierarchical data clustering methods.

A non-limiting example of the external example estimation operation 502 is provided by the formula $$\hat{x}_e = f(x_0^e, y_0^e, y),$$

where $f$ is a regression function such as $$f(x_0^e, y_0^e, y) = y + x_0^e - y_0^e,$$

The patch pair $x_0^e$, $y_0^e$ can be determined using any suitable process. In some embodiments, the image manipulation application 116 can search the external image patch pairs $\{x_e^i, y_e^i\}_{i=1}^M$ to find an image patch $y_0^e$ that is the nearest neighbor of the image patch y and an image patch $x_0^e$ that is a high resolution version of the image patch $y_0^e$.

In additional or alternative embodiments, the image manipulation application 116 can obtain the patch pair patch pair $x_0^e$, $y_0^e$ by selecting a dictionary of low-resolution image patches from the image database 208 that corresponds to the image patch y from the up-sampled auxiliary image 204. A dictionary of image patches can include a group of patches where each patch has a characteristic that is similar to at least one characteristic of the image patch y and where the patches in combination have multiple features similar to multiple features of the image patch y. For example, an image patch y can include a vertical patch with a horizontal edge that is black in color and a vertical edge that is black in color. A first patch $y_a^e$ from the image database 208 may have a horizontal edge that is white in color and a vertical edge that is black in color. A second patch $y_b^e$ from the image database 208 may have a horizontal edge that is black in color and a vertical edge that is white in color. A nearest neighbor search may not individually identify either of the patches $y_a^e$ or $y_b^e$ from the image database 208 as a nearest neighbor of the image patch y from the up-sampled auxiliary image 204 based on each of the image patches $y_a^e$ or $y_b^e$ lacking at least one black colored edge similar image patch y having black vertical and horizontal edges. In contrast, a search for a dictionary $D_y$ that includes image patches $y_a^e$ and $y_b^e$ that collectively include a black vertical edge and a black horizontal edge.

The image manipulation application 116 can use dictionaries of image patches from the image database 208 to obtain $y_0^e$ and $x_0^e$. For example, the image manipulation application 116 can determine $y_0^e$ and $x_0^e$ from the functions $$y_0^e = D_y w^*$$

$$x_0^e = D_x w^*,$$

where dictionary $D_y$ includes a dictionary of image patches that partially match image patch y from the up-sampled auxiliary image 204, $D_x$ represents a dictionary of image patches corresponding to the patch pairs of $D_y$, and w* represents a weight applied to the dictionaries. The weight can include a degree to which each dictionary is used to obtain each image patch. The weight can be determined using any suitable algorithm. In a non-limiting example, the weight w* can be determined from the function $$w^* = \arg\min_w \tfrac{1}{2}\|y - D_y w\|_2^2 + \lambda \|w\|_p,$$

where $\|*\|_p$ represents the $l_p$ norm function for the factor w (e.g., p=1, 2) and w is a representation coefficient vector of patch y with dictionary $D_y$. For a patch y that is represented as a d-dimensional vector, the dictionary $D_y$ can be a d×K matrix and w can be a K-dimensional vector. Multiplying $D_y$ with w can provide a patch that is similar to y. The correspondence between $D_y$ and $D_x$ can cause multiplying $D_x$ with w to produce a high-resolution patch denoted as $x_0^e$.

In some embodiments, dictionary $D_y$ can include the k-nearest neighbors of y. In other embodiments, dictionary $D_y$ can include a pre-determined cluster of image patches corresponding to the patch y. For example, the external image patch pairs $\{x_e^i, y_e^i\}_{i=1}^M$ can be organized in a tree structure or other hierarchical structure. Each leaf in the tree structure can correspond to a cluster of image patches $y_e^i$. The image manipulation application 116 can identify a leaf corresponding to the patch y and use the cluster of image patches $y_e^i$ at the leaf to determine the dictionary $D_y$. In some embodiments, the image manipulation application 116 can set $y_0^e$, $x_0^e$ as cluster centers.

In additional or alternative embodiments, the image manipulation application 116 can search the external image patch pairs $\{x_e^i, y_e^i\}_{i=1}^M$ to find an image patch $y_0^e$ and a corresponding image patch $x_0^e$ that are suitable for improving semantic consistency of the output image 210. The image manipulation application 116 can search the image database 208 to identify a subset of semantically (i.e., visually) similar images from which one or more patch pairs $x_e^i, y_e^i$ 208 can be selected. The image manipulation application 116 can use one or more patch pairs $x_e^i, y_e^i$ from the similar image(s) to perform the external example estimation operation 502.

In additional or alternative embodiments, the image manipulation application 116 can search the external image patch pairs $\{x_e^i, y_e^i\}_{i=1}^M$ to find an image patch $y_0^e$ and a corresponding image patch $x_0^e$ based on semantic labeling of images in the image database 208. The image manipulation application 116 can generate a semantic label for a selected image in the image database 208. The image manipulation application 116 can select patches from images with semantic labels identifying the images as having features similar to those of the input image 202. For example, the image manipulation application 116 can select patches from the image database 208 having the same label as the input patch from the input image 202.

Although self-examples can provide image patches that are more relevant to the content of the input image, a scale-invariance assumption may not be applicable for every patch in an input image. Although external examples can provide suitable patch matching for generic image patterns, the external examples may be less relevant to the unique characteristics of an input image. Generating an output image patch using both self-examples and external examples can improve image enhancement operations.

Figure 6:
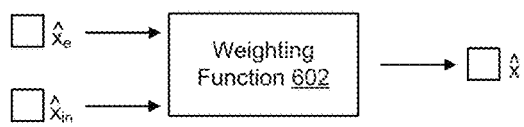
FIG. 6 is a modeling diagram depicting an output image patch generated from interim output image patches using self-examples and external examples.

FIG. 6 is a modeling diagram depicting an output image patch generated from interim output image patches using self-examples and external examples. The image manipulation application 116 can apply a weighting function 602 to the interim output image patch $\hat{x}_{in}$ generated by the self-example estimation operation 402 and interim output image patch $\hat{x}_e$ generated by the external example estimation operation 502. The image manipulation application 116 can combine the weighted interim output patches to generate an output patch x.

The weighting function 602 can include any suitable algorithm or function for determining a degree to which each of the self-example estimation operation 402 and the external example estimation operation 502 contribute to generating an output patch x. The weighting function 602 can include. The weighting function 602 can be adaptively configured based on the content of different patches in the up-sampled auxiliary image 204. For example, the weighting function 602 can be configured based on a first distance between the patch y of the up-sampled auxiliary image 204 and a corresponding patch $y_0^{in}$ of the blurred auxiliary image 206 and a second distance between the patch y of the up-sampled auxiliary image 204 and a corresponding patch $y_0^e$ from the image database 208. The distances between the patch y and a patch $y_0^{in}$ or a patch $y_0^e$ can be the distances between the patch y and the patch $y_0^{in}$ or the patch $y_0^e$ as represented by vectors in an x-y plane or other Euclidean space.

In a non-limiting example, the image manipulation application 116 can generate an output image patch $\hat{x}$ using the function $$\hat{x}=\alpha(y)\hat{x}_{in}+(1-\alpha(y))\hat{x}_e.$$

A weighting function α(y) can apply weights to an interim output image patch $\hat{x}_{in}$ generated using self-examples and an interim output image patch $\hat{x}_e$ generated using external examples. The weights can reflect the degree to which each of the output image patches $\hat{x}_{in}$, $\hat{x}_e$ can provide an output image patch of an output image 210 having sufficient fidelity to an input image 202. An output image 210 can have sufficient fidelity to an input image 202 by including the similar features with a similar level of distinctness as the input image 202.

The image manipulation application 116 can use a content metric to distinguish whether an image patch y forms part of either a smooth region in the up-sampled auxiliary image 204 or a smooth region in the up-sampled auxiliary image 204. A smooth region can include an image region having uniform or near-uniform content throughout the region. For example, a smooth region may be an image region depicting a blue portion of a sky or a white wall of a building. A textured region can include an image region having diverse features throughout the region. For example, a textured region may be an image region depicting clouds in a sky or a brick wall with many windows of a building. For smooth regions in which the signal-to-noise ratio ("SNR") is low, the image manipulation application 116 can apply a heavier weight to an interim output image patch generated using self-examples and/or use the interim output image patch generated using self-examples without using external examples. For textured regions, the image manipulation application 116 can apply a heavier weight to an interim output image patch generated using external examples.

In some embodiments, the content metric R can be determined from the function $$R=\frac{\lambda_1-\lambda_2}{\lambda_1+\lambda_2},$$

where the values $\lambda_1$ and $\lambda_2$ represent energies in the dominant local gradient and edge orientation for an image patch y. The image manipulation application 116 can obtain the values $\lambda_1 \geq \lambda_2 \geq 0$ by determining the gradients of each pixel in an image patch y and performing singular value decomposition ("SVD") on the gradient matrix.

In additional or alternative embodiments, the image manipulation application 116 can measure the content of y using one or more other suitable processes for content measurement.

In some embodiments, the weighting function α(y) can be a regression function such as $$\alpha(y)=g(R,d_e=\|y-y_0^e\|_2^2,d_{in}=\|y-y_0^{in}\|_2^2)\in[0,1].$$

The image manipulation application 116 can learn the regression function based on a suitable parametric form for g. For example, g can be a polynomial function of R, $d_e$, and $d_{in}$, or g can be defined as a multi-layer perception ("MLP") function.

A non-limiting example of a weighting function α(y) is $$\alpha(y)=\begin{cases}\frac{\exp(-ad_{in})}{\exp(-ad_{in})+\exp(-ad_e)}, & R>\delta \\ 1, & R\leq\delta\end{cases},$$

where α is a parameter for scaling matching distances between image patches y and $y_0^e$ and between image patches y and $y_0^e$. The matching distances can be provided by the $L_2$ normalization function. The threshold δ for the content metric R can be used for differentiating smooth regions from textured regions.

The image manipulation application 116 can generate the output image 210 by combining the output image patches x. The image manipulation application 116 can perform a patch estimation for overlapping output image patches based on the up-sampled auxiliary image 204. The image manipulation application 116 can aggregate the output image patches x by averaging multiple predictions on each pixel. Aggregating the overlapping output image patches can generate the output image 210.

In some embodiments, an up-sampling factor s can be small (e.g. s=1.5). For large zooming factors, the image manipulation application 116 can iteratively execute the image enhancement process 200. Iteration of the image enhancement process 200 can terminate based on the output image having a target image resolution. Each iteration can use an up-sampling factor of s.

In some embodiments, the image enhancement process 200 can be applied to each color channel independently of other color channels. In other embodiments, the image enhancement process 200 can be applied to each color channel jointly with other color channels by finding a best-matching patch jointly with sum of distances in multiple color channels. In additional or alternative embodiments, the input image can be converted to luminance/color space. The enhancement algorithm can be applied to the luminance channel for speed.

Although FIGS. 1-6 describe an image enhancement process 200 for increasing the resolution of an input image 202 to obtain an output image 210 having a higher resolution than the input image 202, other implementations are possible. In one non-limiting example, the image enhancement process 200 can be used to perform de-noising of a noisy input image 202 and thereby generate an output image 210 having less noise than the input image 202. The training image database can include image pairs with an image having little or no noise and a corresponding image with noise applied to the image. For de-noising, Y can be a copy of the input image $X_0$_ and $Y_0$ can be a copy of $X_0$. For every patch in y, the patch search can be performed with respect to image patches in the vicinity of y on the same image (i.e. self-similar patch search). A de-noising output prediction $\hat{x}_{in}$ using internal self-examples can be computed using any internal self-similarity-based method such as (but not limited to) non-local means or block-matching with 3D transform domain collaborative filtering ("BM3D").

In another non-limiting example, the image enhancement process 200 can be used to perform de-blurring of a blurred input image 202 and thereby generate an output image 210 having less blurring than the input image 202. The training image database can include image pairs with an un-blurred image and a corresponding image to which a blurring operation is applied. For non-blind image de-blurring, an input image I can be downscaled by a factor of s to obtain an image $X_0^{in}$ in FIG. 2. $Y_0$ can be obtained by convolving $X_0^{in}$ with the similarly downscaled blurring kernel. Y can be the input image I.

Although FIGS. 1-6 describe an image enhancement process 200 as applied to still images, the image enhancement process 200 can also be applied to image content 114 that includes video content. The image manipulation application 116 can search for self-examples across T adjacent frames of video content. For the input video frames $\{X_0^t\}_{t=1}^T$, the image manipulation application 116 can obtain two set of auxiliary frames $\{Y_0^t\}_{t=1}^T$ and $\{Y^t\}_{t=1}^T$ by blurring and analytic up-sampling, respectively. For each unknown patch x of the $i^{th}$ high-resolution frame $X^i$ at a spatial location (u, v), the image manipulation application 116 can obtain a corresponding smooth version y from $Y^i$ at the same spatial location. The image manipulation application 116 can search for a suitable image patch y locally in a spatial location for a temporal domain centered (u/s, v/s, i) from the frame set $\{Y_0^t\}_{t=1}^T$. A suitable function $\hat{x}_{in}=f(x_0^{in}, y_0^{in}, y)$ can be used to determine an interim output image patch $\hat{x}_{in}$. External examples can be used in the same way as image enhancement for a single image to determine an interim output image patch $\hat{x}_e$. The output image patch to determine an interim output image patch $\hat{x}$ can be obtained by adaptively combining the interim output image patch $\hat{x}_{in}$ and the interim output image patch $\hat{x}_e$ based on the local content metric R. The image manipulation application 116 can iteratively up-scale each frame until the output images has a target resolution.

Figure 7:
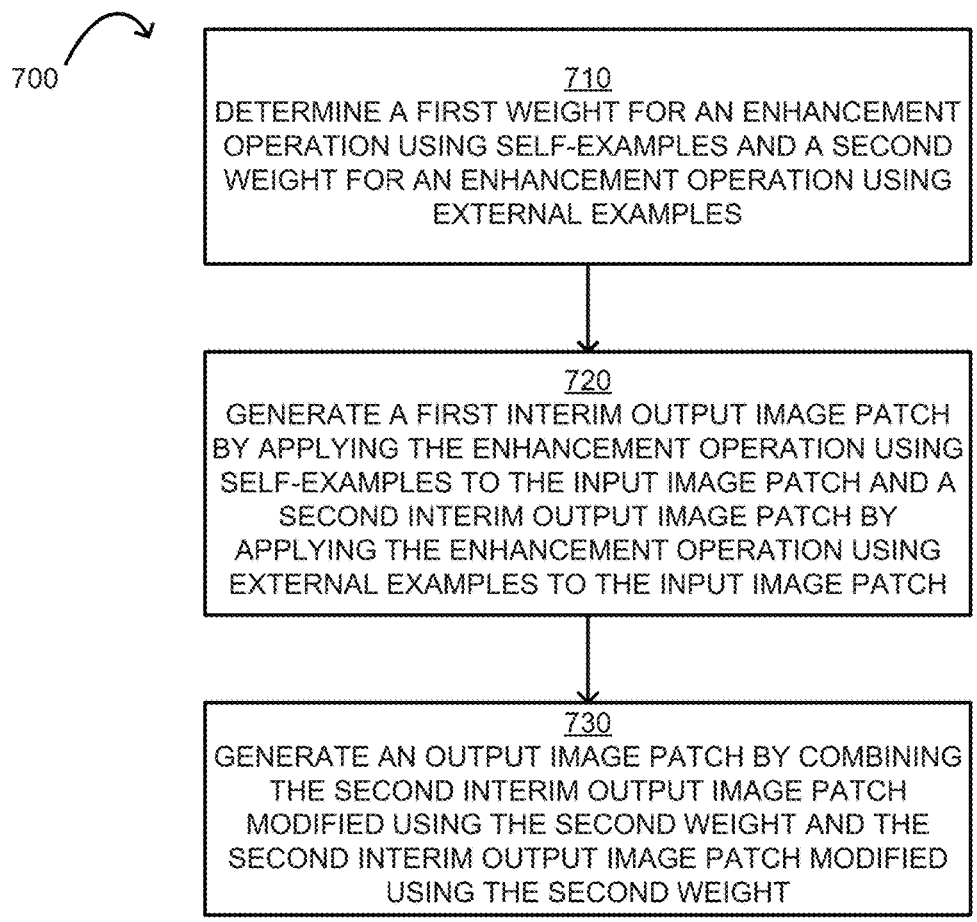
FIG. 7 is a flow chart illustrating an example image enhancement process using self-examples in combination with external examples.

FIG. 7 is a flow chart illustrating an example image enhancement process 200 using self-examples in combination with external examples. For illustrative purposes, the image enhancement process 200 is described with reference to the system implementation depicted in FIG. 1 and the flow of communication depicted in FIGS. 2-6. Other implementations, however, are possible.

The image enhancement process 200 involves determining a first weight for an enhancement operation using self-examples and a second weight for an enhancement operation using external examples, as shown in block 710. An enhancement operation using self-examples can include a self-example estimation operation 402, as described above with respect to FIG. 4. An enhancement operation using external examples can include an external example estimation operation 502, as described above with respect to FIG. 5. The processor 104 of the computing system 102 can execute the image manipulation application 116 to determine weights for the interim output image patches generated by the self-example estimation operation 402 and the external example estimation operation 502 based on the content of an input image patch x as described above with respect to FIG. 6.

The image enhancement process 200 involves generating a first interim output image patch by applying the enhancement operation using self-examples and a second interim output image patch by applying the enhancement operation using external examples, as shown in block 720. For example, the processor 104 of the computing system 102 can execute the image manipulation application 116 to generate an interim output image patch $\hat{x}_{in}$ by applying the self-example estimation operation 402 to an input image patch x, as described above with respect to FIG. 4. The processor 104 of the computing system 102 can execute the image manipulation application 116 to generate an interim output image patch $\hat{x}_e$ by applying the external example estimation operation 502 to the input image patch x, as described above with respect to FIG. 5.

The image enhancement process 200 involves generating an output image patch by combining the first interim output image patch modified using the first weight and the second interim output image patch modified using the second weight, as shown in block 730. The processor 104 of the computing system 102 can execute the image manipulation application 116 to generate an output image patch $\hat{x}$ by combining the interim output image patch $\hat{x}_{in}$ and the interim output image patch $\hat{x}_e$ as modified using the weight function α(y), as described above with respect to FIG. 6.

FIGS. 8-11 provide examples of images modified using an image enhancement process using self-examples in combination with external examples.

Figure 8:
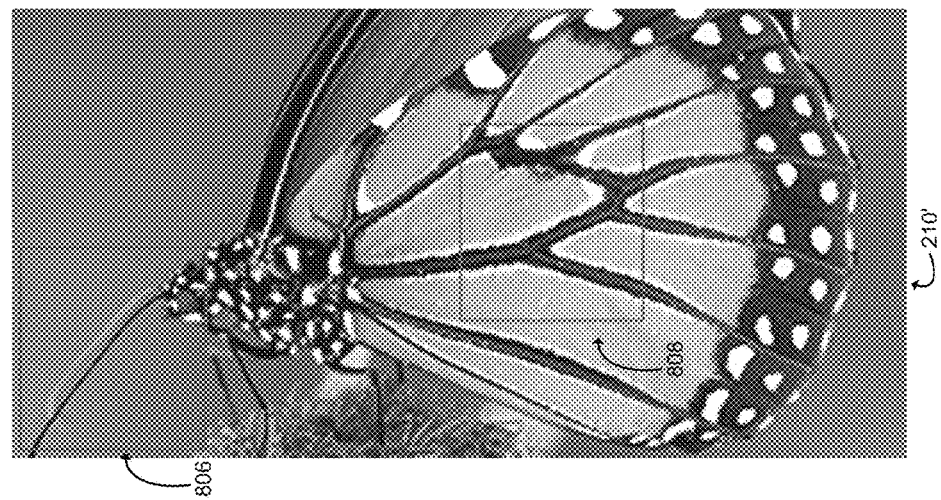
FIG. 8 is a group of images including an example input image, an example up-sampled auxiliary image, and an example output image for an image enhancement process using self-examples in combination with external examples.
Figure 8:
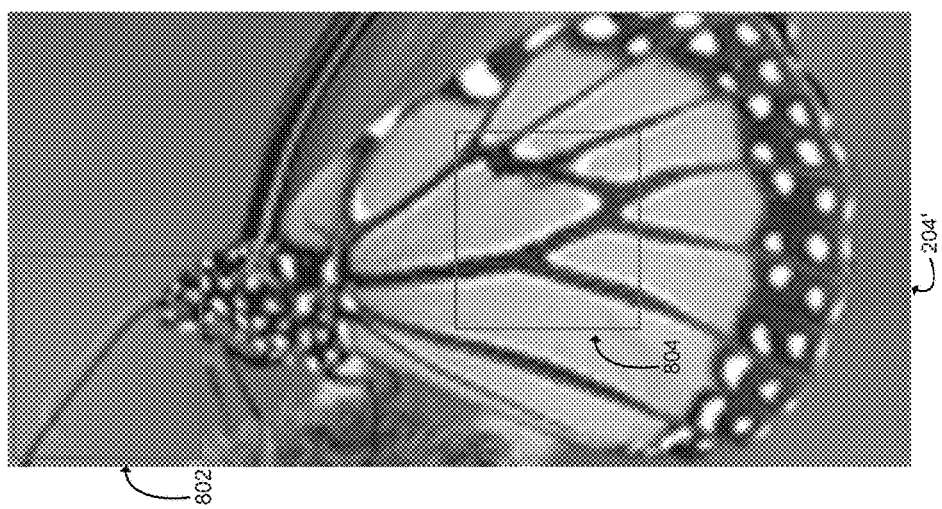
Figure 8:
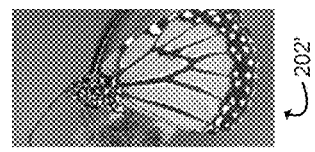
Figure 9:
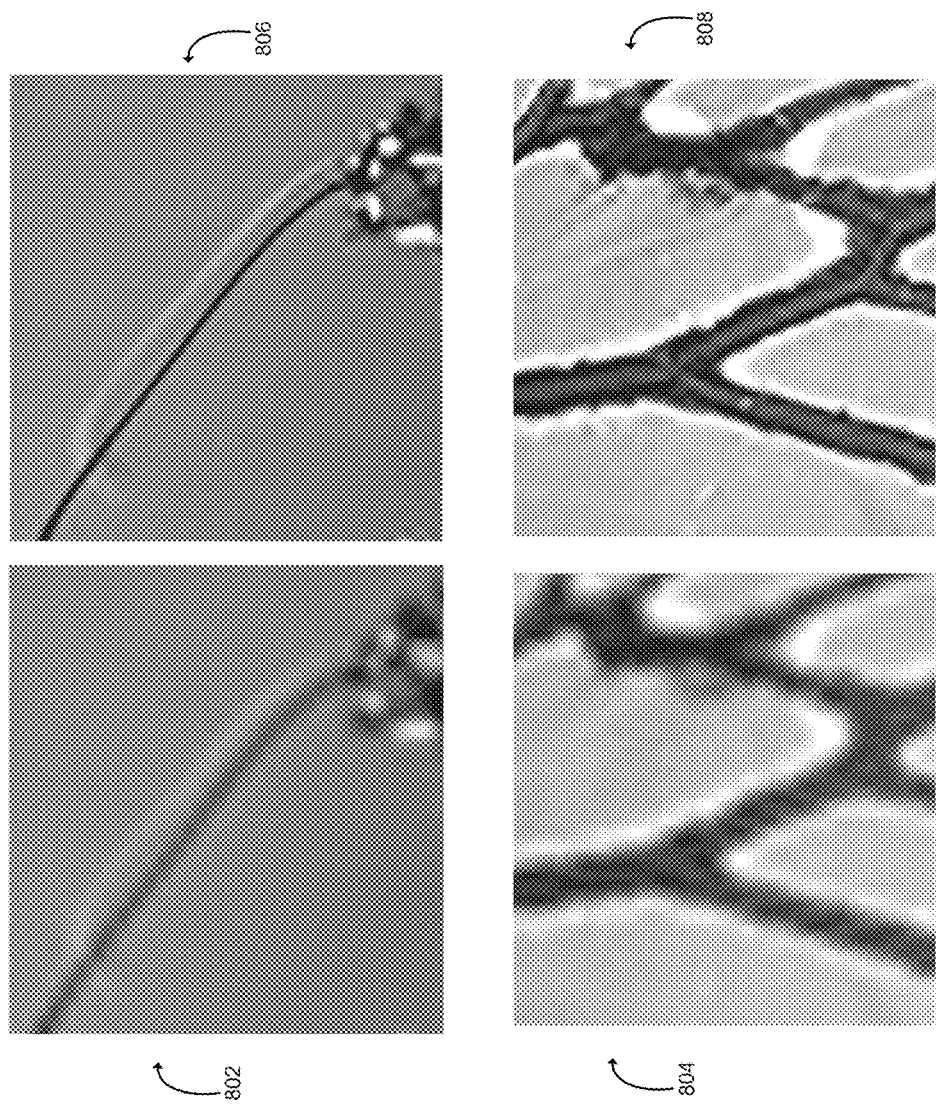
FIG. 9 is a group of images including portions of the example up-sampled auxiliary image and output image of FIG. 8 for an image enhancement process using self-examples in combination with external examples.

FIG. 8 is a group of images including an example input image 202', an example up-sampled auxiliary image 204', and an example output image 210' for an image enhancement process using self-examples in combination with external examples. The up-sampled auxiliary image 204' includes image regions 802, 804. The output image 210' includes image regions 806, 808. FIG. 9 depicts the blurred image regions 802, 804 positioned next to the sharpened image regions 806, 808 generated by image enhancement process using self-examples in combination with external examples. The sharpened image regions 806, 808 from the output image 210' are noticeably sharper than the blurred image regions 802, 804 from the up-sampled auxiliary image 204'.

Figure 10:
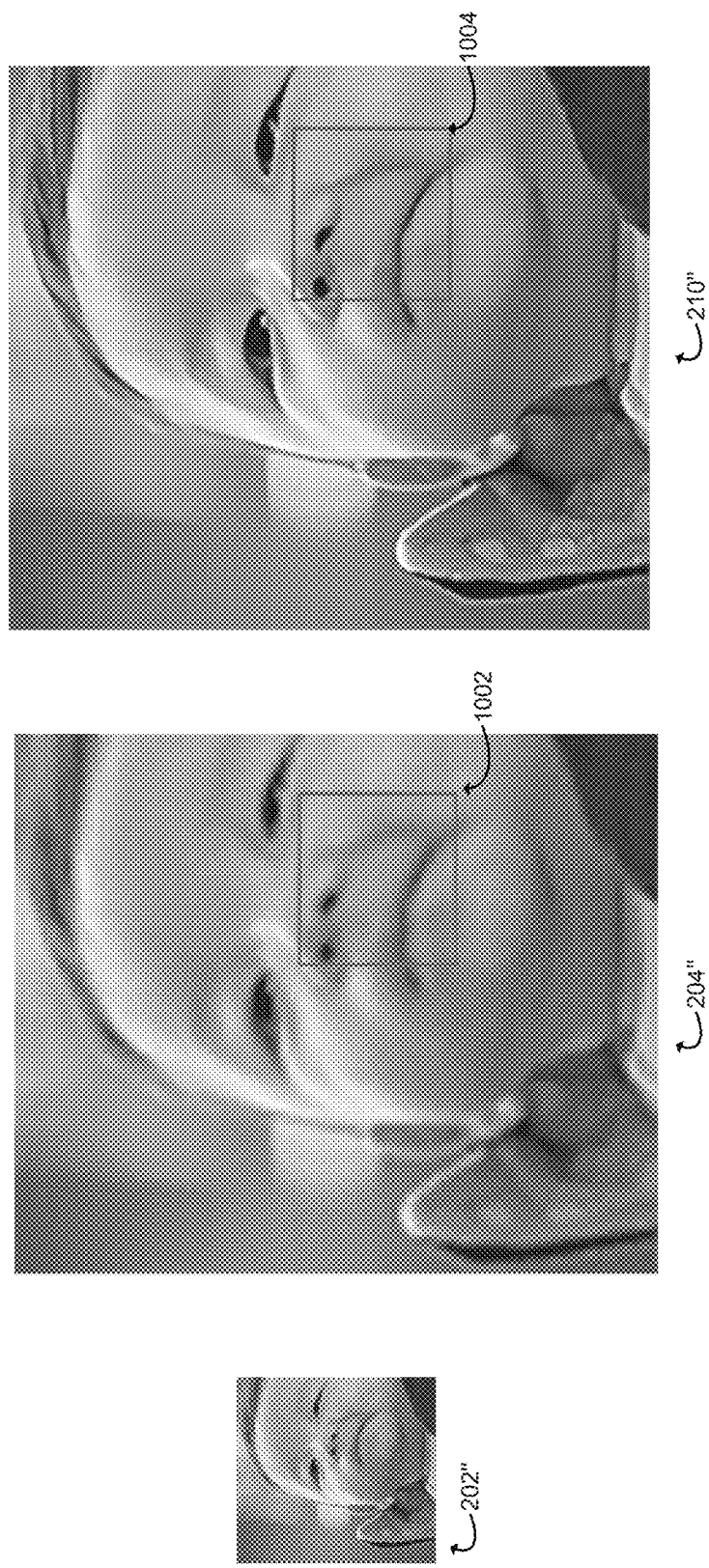
FIG. 10 is a group of images including an example input image, an example up-sampled auxiliary image, and an example output image for an image enhancement process using self-examples in combination with external examples.
Figure 11:
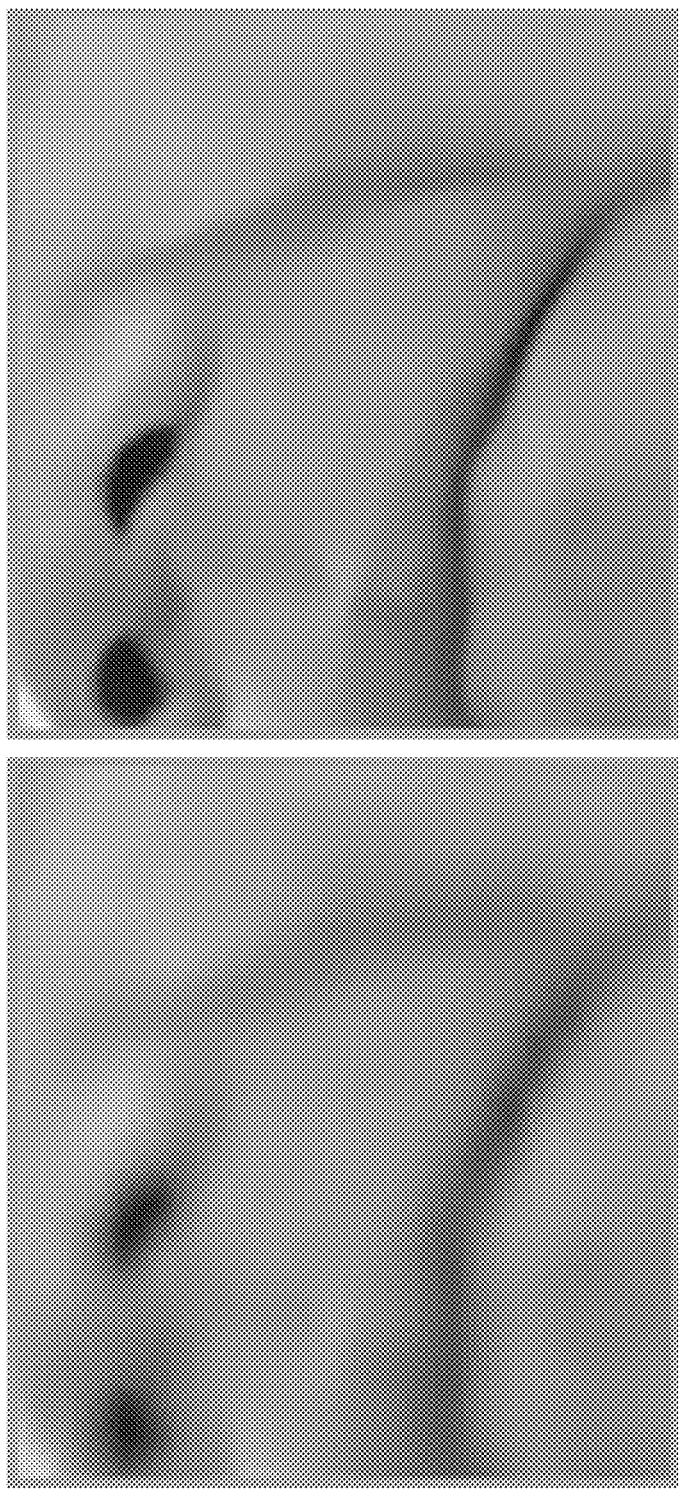
FIG. 11 is a group of images including portions of the example up-sampled auxiliary image and output image of FIG. 10 for an image enhancement process using self-examples in combination with external examples.

FIG. 10 is a group of images including an example input image 202", an example up-sampled auxiliary image 204", and an example output image 210" for an image enhancement process using self-examples in combination with external examples. The up-sampled auxiliary image 204" includes image region 1002. The output image 210" includes image region 1004. FIG. 11 depicts the blurred image region 1002 positioned next to the sharpened image region 1004 generated by image enhancement process using self-examples in combination with external examples. The sharpened image region 1004 from the output image 210" is noticeably sharper than the blurred image region 1002 from the up-sampled auxiliary image 204".

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving, by a processing device, an input image patch of an input image;
   generating, by the processing device, a first interim output image patch by applying, to the input image patch, a first enhancement operation using self-examples;
   generating, by the processing device, a second interim output image patch by applying, to the input image patch, a second enhancement operation using external examples;
   determining, by the processing device, a first weight and a second weight based on (i) a content metric for the input image patch that indicates an amount of smoothness or texture in an up-sampled input image patch that is included in an up-sampled version of the input image and that corresponds to the input image patch, (ii) a first distance between a first vector representing the input image patch and a second vector representing a self-example image patch obtained from a self-example image, and (iii) a second distance between the first vector representing the input image patch and a third vector representing an external-example image patch obtained from an external example image; and
   generating, by the processing device, an output image patch by combining the first interim output image patch modified using the first weight and the second interim output image patch modified using the second weight.

2. The method of claim 1, wherein the first vector representing the input image patch is obtained from the up-sampled input image patch, wherein determining the first weight and the second weight comprises:
   generating a gradient matrix for the up-sampled input image patch that matches the input image patch;
   determining, based on the gradient matrix, a dominant local gradient and an edge orientation for the up-sampled input image patch; and
   generating the content metric based on the dominant local gradient and the edge orientation.

3. The method of claim 1, wherein the input image patch includes high-frequency content, wherein the first vector representing the input image patch is obtained from the up-sampled input image patch, wherein applying the first enhancement operation to the input image patch comprises:
   identifying the up-sampled input image patch based on the up-sampled input image patch matching the input image patch, wherein the up-sampled input image patch lacks the high-frequency content;
   selecting a blurred input image patch from a blurred version of the input image;
   obtaining the high-frequency content from the blurred version of the input image by subtracting a vector representing the blurred input image patch from a vector representing the input image patch; and
   generating the first interim output image patch by applying, to the up-sampled input image patch, the high-frequency content obtained from the blurred input image patch.

4. The method of claim 1, wherein the input image patch includes high-frequency content, wherein applying the second enhancement operation to the input image patch comprises:
- identifying the up-sampled input image patch, wherein the up-sampled input image patch lacks the high-frequency content;
- selecting, from an image region of an external image that is similar to the input image, a low-resolution image patch;
- selecting a high-resolution image patch from the image region that is a high-resolution version of the low-resolution image patch;
- obtaining, from the low-resolution image patch, the high-frequency content by subtracting a vector representing the low-resolution image patch from a vector representing the high-resolution image patch; and
- generating the second interim output image patch by applying the high-frequency content from the low-resolution image patch to the up-sampled input image patch.

5. The method of claim 1, wherein each of the first enhancement operation and the second enhancement operation comprises a de-noising operation for generating an output image comprising the output image patch, wherein the output image has a lower amount of noise than the input image.

6. The method of claim 1, wherein each of the first enhancement operation and the second enhancement operation comprises a de-blurring operation for generating an output image comprising the output image patch, wherein the output image has a lower amount of blurring than the input image.

7. The method of claim 1, wherein each of the first enhancement operation and the second enhancement operation comprises a super-resolution operation for generating an output image comprising the output image patch, wherein the output image has a higher resolution than the input image.

8. A system comprising:
- a processing device; and
- a non-transitory computer-readable medium communicatively coupled to the processing device;
- wherein the processing device is configured to execute an image manipulation application embodied in the non-transitory computer-readable medium, wherein executing the image manipulation application configures the processing device to perform operations comprising:
  - receiving an input image patch of an input image,
  - determining a dominant local gradient and an edge orientation for an up-sampled input image patch matching the input image patch, wherein the up-sampled input image patch is included in an up-sampled version of the input image,
  - generating, based on the dominant local gradient and the edge orientation, a content metric for the input image patch that indicates an amount of smoothness or texture in the up-sampled input image patch,
  - generating a first interim output image patch by applying, to the input image patch, a first enhancement operation using self-examples,
  - generating a second interim output image patch by applying, to the input image patch, a second enhancement operation using external examples,
  - determining a first weight and a second weight based on the content metric, and
  - generating an output image patch by combining the first interim output image patch modified using the first weight and the second interim output image patch modified using the second weight.

9. The system of claim 8, wherein the first weight and the second weight are also determined based on:
- a first distance between a first vector representing the up-sampled input image patch and a second vector representing a blurred image patch obtained from a blurred version of the input image; and
- a second distance between the vector representing the up-sampled input image patch and a third vector representing an external-example image patch obtained from an external example image.

10. The system of claim 8, wherein the input image patch includes high-frequency content, wherein applying the first enhancement operation to the input image patch comprises:
- identifying the up-sampled input image patch, wherein the up-sampled input image patch lacks the high-frequency content;
- selecting a blurred input image patch from a blurred version of the input image;
- obtaining the high-frequency content from the blurred version of the input image by subtracting a vector representing the blurred input image patch from a vector representing the input image patch; and
- generating the first interim output image patch by applying, to the up-sampled input image patch, the high-frequency content obtained from the blurred input image patch.

11. The system of claim 8, wherein the input image patch includes high-frequency content, wherein applying the second enhancement operation to the input image patch comprises:
- identifying the up-sampled input image patch, wherein the up-sampled input image patch lacks the high-frequency content;
- selecting, from an image region of an external image that is similar to the input image, a low-resolution image patch;
- selecting a high-resolution image patch from the image region that is a high-resolution version of the low-resolution image patch;
- obtaining, from the low-resolution image patch, the high-frequency content by subtracting a vector representing the low-resolution image patch from a vector representing the high-resolution image patch; and
- generating the second interim output image patch by applying the high-frequency content from the low-resolution image patch to the up-sampled input image patch.

12. The system of claim 8, wherein each of the first enhancement operation and the second enhancement operation comprises a de-noising operation for generating an output image comprising the output image patch, wherein the output image has a lower amount of noise than the input image.

13. The system of claim 8, wherein each of the first enhancement operation and the second enhancement operation comprises a de-blurring operation for generating an output image comprising the output image patch, wherein the output image has a lower amount of blurring than the input image.

14. The system of claim 8, wherein each of the first enhancement operation and the second enhancement operation comprises a super-resolution operation for generating an output image comprising the output image patch, wherein the output image has a higher resolution than the input image.

15. A non-transitory computer-readable medium tangibly embodying program code executable by a processor for providing an image manipulation application, the program code comprising:
- program code for receiving an input image patch of an input image;
- program code for generating a first interim output image patch by applying, to the input image patch, a first enhancement operation using self-examples;
- program code for generating a second interim output image patch by applying, to the input image patch, a second enhancement operation using external examples;
- program code for determining a first weight and a second weight based on a content metric for the input image patch that indicates an amount of smoothness or texture in an up-sampled input image patch that is included in an up-sampled version of the input image and that corresponds to the input image patch; and
- generating an output image patch by combining the first interim output image patch modified using the first weight and the second interim output image patch modified using the second weight.

16. The non-transitory computer-readable medium of claim 15, wherein determining the first weight and the second weight comprises:
- generating a gradient matrix for the up-sampled input image patch that matches the input image patch;
- determining, based on the gradient matrix, a dominant local gradient and an edge orientation for the up-sampled input image patch; and
- generating the content metric based on the dominant local gradient and the edge orientation.

17. The non-transitory computer-readable medium of claim 16, wherein the first weight and the second weight are also determined based on:
- a first distance between a first vector representing the input image patch and a second vector representing a self-example image patch obtained from a self-example image, wherein the first vector representing the input image patch is obtained from the up-sampled input image patch; and
- a second distance between the first vector representing the input image patch and a third vector representing an external-example image patch obtained from an external example image.

18. The non-transitory computer-readable medium of claim 15, wherein the input image patch includes high-frequency content, wherein applying the first enhancement operation to the input image patch comprises:
- identifying the up-sampled input image patch based on the up-sampled input image patch matching the input image patch, wherein the up-sampled input image patch lacks the high-frequency content;
- selecting a blurred input image patch from a blurred version of the input image;
- obtaining the high-frequency content from the blurred version of the input image by subtracting a vector representing the blurred input image patch from a vector representing the input image patch; and
- generating the first interim output image patch by applying, to the up-sampled input image patch, the high-frequency content obtained from the blurred input image patch.

19. The non-transitory computer-readable medium of claim 15, wherein the input image patch includes high-frequency content, wherein applying the second enhancement operation to the input image patch comprises:
- identifying the up-sampled input image patch, wherein the up-sampled input image patch lacks the high-frequency content;
- selecting, from an image region of an external image that is similar to the input image, a low-resolution image patch;
- selecting a high-resolution image patch from the image region that is a high-resolution version of the low-resolution image patch;
- obtaining, from the low-resolution image patch, the high-frequency content by subtracting a vector representing the low-resolution image patch from a vector representing the high-resolution image patch; and
- generating the second interim output image patch by applying the high-frequency content from the low-resolution image patch to the up-sampled input image patch.

20. The non-transitory computer-readable medium of claim 15, wherein each of the first enhancement operation and the second enhancement operation comprises at least one of:
- a de-noising operation for generating a de-noised output image comprising the output image patch, wherein the de-noised output image has a lower amount of noise than the input image;
- a de-blurring operation for generating a de-blurred output image comprising the output image patch, wherein the de-blurred output image has a lower amount of blurring than the input image; or
- a super-resolution operation for generating a super-resolution output image comprising the output image patch, wherein the super-resolution output image has a higher resolution than the input image.

* * * * *